United States Patent Office 3,476,687
Patented Nov. 4, 1969

3,476,687
HIGH TEMPERATURE GREASE
Thomas W. Martinek, Danville, Ill., Robert M. Haines, Placentia, Calif., Roger L. Weichman, Orono, Maine, and Wilbur J. Trainor, Woodstock, Ill., assignors to Union Oil Company of California, Los Angeles, Calif., a corporation of California
No Drawing. Filed Sept. 26, 1966, Ser. No. 581,690
Int. Cl. C10m 5/10
U.S. Cl. 252—59     4 Claims

ABSTRACT OF THE DISCLOSURE

A grease composition comprising a major proportion of a mineral oil and an amount of p-polyphenyl sufficient to thicken the oil to a grease consistency.

---

This invention relates to grease compositions in which the thickening agent is p-polyphenyl.

Numerous polymerized hydrocarbons have been previously employed as additives for lubricating oil compositions and greases. Examples are polymers of ethylene, propylene, butenes, pentenes, etc. These polymers are, however, commonly deficient in one or more characteristics that are desirable in a grease composition, such as high dropping or melting points, low oil-solubility, high resistance to oxidation, etc.

In accordance with this invention, it has been discovered that these difficulties may be overcome by the use of p-polyphenyl as the thickening agent in grease compositions. The resulting greases exhibit no melting point to temperatures as high as the ignition point of the base oil and have excellent lubricating properties.

p-Polyphenyl, which has the formula

has been prepared by a number of prior art processes, e.g., that of Marvel and Hartzell (JACS 81, 448 (1959)), which involves polymerization of 1,3-cyclo-butadiene and dehydration of the resulting polymer, and that of Kovacic and Kyriakis (JACS 85, 454 (1963)), in which benzene is contacted with an oxidizing agent such as cupric chloride in the presence of a Lewis acid catalyst such as aluminum chloride with a small amount of water as co-catalyst. Copending application Ser. No. 345,946, and now abandoned, of Weichman and Fierce discloses an improvement over the latter method in which water is not used as a co-catalyst. Molecular weights of the polymers are difficult to determine due to their extreme insolubility but will generally range from about 5,000 to 50,000, i.e., $n$ in the above formula ranges from about 66 to 660.

The base oils that may be used for preparing the greases of the invention include a wide variety of lubricating oils, such as naphthenic base, paraffin base, and mixed base lubricating oils, other hydrocarbon lubricants, e.g., lubricating oils derived from coal products, and the synthetic oils, e.g., alkylene polymers (such as polymers of propylene, butylene, etc., and mixtures thereof), alkylene oxide-type polymers (e.g., propylene oxide polymers) and derivatives thereof, including alkylene oxide polymers prepared by polymerizing the alkylene oxides in the presence of water or alcohols, e.g., ethyl alcohol, dicarboxylic acid esters (such as those which are prepared by esterifying such dicarboxylic acids as adipic acid, azelaic acid, sebacic acid, alkanol succinic acid, etc., with alcohols such as butyl alcohol, hexyl alcohol, 2-ethyl hexyl alcohol, etc.), liquid esters of acids of phosphorus, alkyl benzenes (e.g., monoalkyl benzenes such as dodecyl benzene, tetradecyl benzene, etc.), etc.

The above base oils may be used individually or in combinations thereof, wherever miscible or wherever made so by use of mutual solvents.

The grease compositions of this invention are prepared by conventional methods of grease making. That is, lubricating greases can be prepared by milling the mixture of base oil and p-polyphenyl to effect dispersion of the polymer in the oil. Heating of the polymer, oil or the mixture before or during milling may also assist in dispersing the polymer. Milling pressures may vary to give compositions in which the particle size of the dispersed polymer ranges from about 2 to 10μ. These values are, however, not critical and may vary widely depending on intended use of the grease.

Proportions of the polymer in the oil will generally range from about 1 to 40 weight percent; however, they are also not critical and optimum amounts may vary considerably depending on the intended use of the grease composition. Such uses include high temperature greases, encapsulating compositions, rust preventives, etc. Determination of optimum values of the above variables will be obvious to one of ordinary skill in the art.

Other conventional additives may also be desirable in the grease compositions of the invention for certain uses. These additives include oxidation or corrosion inhibitors, dispersing agents, dyes, etc.

The invention is more specifically illustrated by the following example.

21.9 grams of p-polyphenyl was added to 78.1 grams of 80 Vis Neutral and the mixture was milled several times on a 3-roll laboratory paint mill. The resultant mixture was a non-bleeding, non-melting grease with an NLGI penetration of about 300.

We claim:
1. A grease composition comprising a major proportion of a mineral oil of lubricating viscosity and an amount of p-polyphenyl sufficient to thicken the oil to the consistency of a grease.
2. The composition of claim 1 in which the proportion of the p-polyphenyl ranges from about 1 to 40 percent by weight.
3. The composition of claim 1 in which the molecular weight of the p-polyphenyl ranges from about 5,000 to about 50,000.
4. A grease composition consisting essentially of a mineral oil of lubricating viscosity and p-polyphenyl having a molecular weight in the range of 5,000 to 50,000, the amount of said p-polyphenyl being sufficient to thicken the oil to the consistency of a grease.

References Cited

UNITED STATES PATENTS 3,291,732   12/1966   Spilners et al. _____ 252—59
3,384,588   5/1968    McMahon et al. _____ 252—59

DANIEL E. WYMAN, Primary Examiner

I. VAUGHN, Assistant Examiner